US010186863B2

United States Patent
Rüdlinger

(10) Patent No.: US 10,186,863 B2
(45) Date of Patent: Jan. 22, 2019

(54) COMBINED ENERGY NETWORK

(71) Applicant: RV LIZENZ AG, Zug (CH)

(72) Inventor: Mikael Rüdlinger, Zug (CH)

(73) Assignee: RV LIZENZ AG, Zug (CH)

( * ) Notice: Subject to any disclaimer, the term of this patent is extended or adjusted under 35 U.S.C. 154(b) by 30 days.

(21) Appl. No.: 15/038,152

(22) PCT Filed: Nov. 21, 2014

(86) PCT No.: PCT/EP2014/075330
§ 371 (c)(1),
(2) Date: May 20, 2016

(87) PCT Pub. No.: WO2015/075204
PCT Pub. Date: May 28, 2015

(65) Prior Publication Data
US 2016/0285266 A1 Sep. 29, 2016

(30) Foreign Application Priority Data
Nov. 21, 2013 (EP) .................................. 13193803

(51) Int. Cl.
*H02J 1/12* (2006.01)
*H02J 3/00* (2006.01)
(Continued)

(52) U.S. Cl.
CPC . *H02J 3/06* (2013.01); *C10J 3/62* (2013.01); *H02J 3/04* (2013.01); *H02J 3/381* (2013.01);
(Continued)

(58) Field of Classification Search
CPC .............. C10J 3/62; C10J 2300/1815; C10J 2300/1665; C10J 2300/1671; H02J 3/04; H02J 3/381
See application file for complete search history.

(56) References Cited

U.S. PATENT DOCUMENTS

| 7,358,620 B2 * | 4/2008 | Melfi ................ H02J 9/066 290/1 A |
| 2011/0221269 A1 * | 9/2011 | Borger ................ H02J 1/102 307/26 |

(Continued)

FOREIGN PATENT DOCUMENTS

| DE | 27 30 406 A1 | 1/1978 |
| DE | 30 19 198 A1 | 11/1981 |

(Continued)

OTHER PUBLICATIONS

Lombardo, Tom, http://www.engineering.com/ElectronicsDesign/ElectronicsDesignArticles/ArticleID/6112/The-Perfect-Power-Microgrid-at-IIt.aspx, "The Perfect Power Microgrid at IIT," retrieved Jul. 21, 2014 (4 pages).

(Continued)

*Primary Examiner* — Alfonso Perez Borroto
*Assistant Examiner* — Esayas Yeshaw
(74) *Attorney, Agent, or Firm* — Pauley Erickson & Kottis

(57) ABSTRACT

The invention relates to an energy supply system (2) having a first energy supply network (4) including a power network (36) for transporting electrical energy (46), and a second energy supply network (6) having a transport system (60) for fluid operating materials (56), said energy supply system comprising at least one energy-generating unit (8), and through electrical energy and carbon-containing material (50, 54, 58) the fluid operating materials are produced and fed into the second energy supply network, and further comprising at least one local energy management unit (10), by means of which fluid operating materials extracted from the second energy supply network can be converted into electrical energy (74, 76, 78) and can be fed into a local power network (90). The second energy supply network (6) has a transport system (62) for the return transport of carbon
(Continued)

dioxide-containing residual gases (58), which are incurred during the energy recycling of the fluid operating materials (56) by one or more energy consumers (11) and/or energy management units (10).

24 Claims, 7 Drawing Sheets

(51) Int. Cl.
*H02J 3/06* (2006.01)
*C10J 3/62* (2006.01)
*H02J 3/04* (2006.01)
*H02J 3/38* (2006.01)
*H02J 3/46* (2006.01)
*H02J 13/00* (2006.01)

(52) U.S. Cl.
CPC ............ *H02J 3/46* (2013.01); *H02J 13/0017* (2013.01); *C10J 2300/1659* (2013.01); *C10J 2300/1665* (2013.01); *C10J 2300/1671* (2013.01); *C10J 2300/1815* (2013.01); *Y02E 20/14* (2013.01); *Y02P 20/129* (2015.11)

(56) References Cited

U.S. PATENT DOCUMENTS

| | | | | |
|---|---|---|---|---|
| 2012/0010305 A1* | 1/2012 | Grauer | ...................... | C25B 1/04 518/704 |
| 2012/0228932 A1* | 9/2012 | Mahler | .................. | G01D 4/004 307/18 |
| 2012/0271470 A1* | 10/2012 | Flynn | ...................... | H02J 3/383 700/292 |
| 2013/0131876 A1* | 5/2013 | Lee | ......................... | H04L 12/10 700/286 |
| 2014/0163762 A1* | 6/2014 | Nakamura | ................ | H02J 3/32 700/295 |
| 2015/0148975 A1* | 5/2015 | Jeong | ......................... | H02J 3/32 700/287 |
| 2015/0155714 A1* | 6/2015 | Heid | ......................... | H02J 3/32 123/2 |

FOREIGN PATENT DOCUMENTS

| | | |
|---|---|---|
| DE | 31 23 875 A1 | 3/1982 |
| DE | 43 12 811 C1 | 10/1994 |
| DE | 103 11 091 A1 | 9/2004 |
| EP | 2 325 287 A1 | 5/2011 |
| EP | 2 348 253 A1 | 7/2011 |
| WO | WO 2007/136344 A1 | 11/2007 |
| WO | WO 2011/061299 A1 | 5/2011 |
| WO | WO 2011/089200 A2 | 7/2011 |
| WO | WO 2012/074478 A1 | 6/2012 |

OTHER PUBLICATIONS

Kwasinski, Alexis, "Technology Planning for Electric Power Supply in Critical Events Consideratin a Bulk Grid, Backup Power Plants, and Micro-Grids," IEEE Systems Journal, Jun. 1, 2010, vol. 4. No. 2, pp. 167-178.

Shahidehpour, Mohammad, et al., "Cutting Campus Energy Costs with Hierarchical Control: The Economical and Reliable Operation of a Microgrid," IEEE Electrification Magazine, Oct. 23, 2013, vol. 1, No. 1, pp. 40-56.

\* cited by examiner

COMBINED ENERGY NETWORK

BACKGROUND OF THE INVENTION

Field of the Invention

The invention relates to energy supply systems, energy management units, and methods for supplying local and regional energy systems and energy consumers with power according to the preamble of the independent claims.

Discussion of Related Art

Known energy supply systems are based on the concept that centralized energy-generating units make energy available in a certain form, for example as electrical energy, as thermal energy in the form of hot water or hot steam (district heating), or as chemical energy in the form of natural gas, and deliver these via suitable power systems to a multitude of energy consumer units.

When supplying energy to a plurality of spatially distributed energy consumer units, for example households with electrical power, the sufficient dimensioning and structuring of the corresponding supply network is a fundamental factor for ensuring sufficient supply power and security of supply.

Supply networks often comprise various hierarchy levels. Several local or regional consumer units can be grouped together into a local network which, in turn, can be connected to a higher-level network. In the case of a power network, for example, a plurality of small consumer units, different households, for example are connected to a common, local low-voltage grid. Different low-voltage networks, in turn, are connected via transformers to a medium-voltage network that is used for regional energy transport. A high-voltage distribution network is used to transport the electrical energy from large power stations over long distances to the medium-voltage networks. Smaller power stations can also feed the energy into the medium-voltage network, and local energy producers, such as photovoltaic systems or wind power stations, for example, into the low-voltage network.

Another example of a supply network is a district heating system, in which heat energy is produced in the form of water vapor or hot water (for example, 120° C., 16 bar) and transported via a primary circuit to the various consumer units, where it is used to heat buildings and produce hot water. In common district heating systems, the heat energy is produced centrally in a combined heat and power plant, for example in a woodchip heating system or a waste-incineration plant. The energy consumers are connected via suitable heat exchangers directly, or indirectly via a local secondary circuit, to the primary circuit of the district heating system. Analogously to district heating networks, district cooling networks also exist, although it is basically heat energy that is transported in those as well.

In the case of energy supply via a spatially distributed supply network that is fed by one or more energy producers, the required capacity both of the supply network and of the energy producers results from the maximum required peak energy requirement of the energy consumers. This energy requirement is generally subject to substantial time fluctuations. In a district heating network, for example, consumption peaks occur in the early morning and in the late evening, whereas in an electrical grid, consumption peaks occur in the morning, at midday and in the evening.

As a result of the fluctuating energy demand, a spatially distributed supply network must be designed for a multiple of the average energy throughput. In district heating systems, for example, the lines must be designed such that they can handle the expected maximum daily consumption peak on the coldest day of winter. A supply network with an excessively weak design can lead to insufficient energy supply as a result of a capacity bottleneck.

In the case of a power network, overloading can even lead to a collapse of the grid. The fuses disposed at the nodes of the network having an upper limit of 1000 A, for example, are crucial in this regard. In a network designed for 50 kV, this results in a maximum output of 50 MW, and in a network designed for 25 kV, in a maximum output of 25 MW. Since the investment costs for supply networks rise disproportionately to their capacity due to more expensive technology, lower consumption peaks can result in substantial savings in the construction and operation of the network.

Analogously to the supply network, the energy producers must also be capable of covering the consumption peaks. In the case of electrical power stations, slow power stations for the base load production (nuclear power stations, coal-fired power plants, run-of-the-river hydro power stations, wind power stations, etc.) and quick-starting power stations for the peak load production (storage hydro power stations, gas-fired power plants, etc.) are combined for this purpose. The necessary excess capacities also result in higher investment costs.

Due to the growing number of small power stations connected to regional or local power networks, such as photovoltaic systems and wind power stations, for example, the fluctuations in production turn out to be difficult to forecast for the network operator. What is more, since the network operators are in part obligated for legal reasons to feed the locally produced energy into the network, production cannot even be controlled in some cases. These additional energy production peaks must also be taken into account during the designing of the networks and further reduce the average usable capacity.

Various approaches are known for achieving a more uniform loading of energy supply networks, and thus for achieving a lower required capacity of network and energy producers, as well as improved energy efficiency as a result of the associated lower losses.

For the power supply, so-called smart grids are used in the attempt to achieve a spatially and temporally maximally homogeneous loading of the network through coordination of different flexible and non-flexible energy production systems, energy storage systems (pumped storage power plants) and energy consumption systems. For this purpose, the various components of the smart grid communicate with one another. This has its limits, in that the local consumption and local production of electrical energy can be controlled from the outside only to a limited extent.

In district heating systems, through the use of appropriate heat energy stores in the form of hot-water tanks or latent heat accumulators (as shown in DE 2730406 C2, for instance), fluctuations in the energy demand over the course of the day can be evened out. It is known, for example from DE 2730406 C2, to balance out the energy requirement over a day through the use of suitable heat accumulators, for example hot-water tanks or latent heat accumulators. Through the appropriate coupling of hot water accumulators, heating systems and hot water preparation, the efficiency of the heat utilization can be improved, for example as described in DE 10311091 B4 and DE 3123875 C2.

In the article *"Technology Planning for Electric Power Supply in Critical Events Considering a Bulk Grid, Backup Power Plants, and Micro Grids,"* IEEE Systems Journal 4(2), p. 167, Jun. 3, 2010, A. Kwasinski discusses the risk assessment of energy supply systems in natural disasters using the example of three technological options for supplying local networks with power, namely connection to an external network by means of a substation; a backup diesel power station at the interface between local network and external network; and a microgrid with its own energy production, for example power generators driven by gas turbines.

In their article "Cutting Campus Energy Costs with Hierarchical Control," IEEE Electrification Magazine September 2013, p. 40, Sep. 23, 2013, M. Shahidehpour et al. describe a microgrid at the Illinois Institute of Technology in which power generators are operated by means of gas turbines in order to balance out power outages on the external supply network. Accumulators are used to bridge over short-term power outages without the use of generators. Other aspects are controlling the system in view of the costs of the energy obtained, the construction of the internal power network with several separate supply circuits in order to reduce internal power outages to a minimum in buildings, and the integration of renewable energy sources (photovoltaics, wind energy) into the local network.

There is a general need for optimally efficient energy supply networks that also preferably involve minimal new investments.

SUMMARY OF THE INVENTION

It is an object of the invention to provide an energy supply system of the type mentioned at the outset that does not have the abovementioned and other drawbacks. In particular, such an energy supply system is intended to enable the efficient distribution of energy. It should be possible to design the capacities of the network required for the distribution so as to be as small as possible. Furthermore, such a system is to be robust and stable, as well as insensitive to power peaks. It is another object of the invention to provide an energy supply system that makes it possible to efficiently utilize regenerative sources of energy such as wind power and solar energy, for example, whose output can be controlled only to a very limited extent and are primarily the result of meteorological parameters.

These and other objects are achieved by an energy supply system according to the invention, an energy management unit according to the invention, and a method according to the invention according to the independent claims. Other preferred embodiments are indicated in the dependent claims.

A first aspect of the invention relates to an advantageous energy supply system. Such an energy supply system according to the invention comprises a first energy supply network in the form of a power network for transporting electrical energy and a second energy supply network with a transport system for fluid operating materials. The energy supply system has at least one energy-generating unit with which the fluid operating materials can be generated using hydrogen gas and carbon-containing material and fed into the second energy supply network, and at least one local energy management unit with which fluid operating materials taken from the second energy supply network can be converted into electrical energy and fed into a local power network. Advantageously, the second energy supply network has a transport system for returning carbon dioxide-containing residual gases that occur during the energetic utilization of the fluid operating materials at one or more energy consumers and/or energy management units.

One advantageous embodiment of an energy supply system according to the invention comprises a first energy supply network in the form of a power network for transporting electrical energy; a second energy supply network with a transport system for fluid operating materials; a transport system for returning carbon dioxide-containing residual gases that occur during the energetic utilization of the fluid operating materials at one or more energy consumers; and at least one energy-generating unit with which the fluid operating materials can be produced from carbon-containing material and fed into the second energy supply network. The energy supply system further comprises at least one local energy management unit for supplying a local energy supply network with which the fluid operating materials taken from the second energy supply network can be converted and fed into a local power network. The at least one energy management unit comprises devices for extracting electric current from the higher-level power network of the energy supply system, converting it into lower-voltage electric current, and feeding this lower-voltage electric current into a power network of the local energy supply network; as well as devices for extracting the fluid operating materials from the transport system for fluid operating materials of the energy supply system, for generating electric current from said fluid operating materials, and for feeding the electric current into said power network of the local energy supply network; and devices for collecting residual gases occurring during the energetic utilization of the fluid operating materials in the energy management unit, and for returning these residual gases to the residual gas transport system of the energy supply network. The energy supply system further comprises a control unit of the energy supply system that can communicate via a communication network with the at least one energy-generating unit and the at least one energy management unit or with another energy consumer of the energy supply system and is set up for the purpose of controlling the operation of the various units. A control system of the at least one energy management unit is set up for the purpose of communicating via the communication network with the control unit of the energy supply system.

In an advantageous embodiment of such an energy supply system according to the invention, the control unit of the energy supply system is set up for the purpose of controlling the delivery rate of electric current from the higher-level power network and from fluid operating materials from the operating material transport system such that a maximally small dimensioning of the second energy supply network is achieved in relation to the line cross section and/or the operating pressure.

Alternatively or in addition, the control unit of the energy supply system is set up for the purpose of controlling the delivery rates of electric current from the higher-level power network and from fluid operating materials from the operating material transport system such that a maximally uniform loading of the corresponding supply networks over time is achieved.

In another advantageous embodiment of the discussed energy supply system according to the invention, the at least one energy-generating unit is set up for the purpose of extracting residual gas from the residual gas transport system and using its carbon-containing fractions to produce the fluid operating materials.

Since residual gas consists substantially of carbon dioxide, a hydrogen atom source is required to balance out the mass balance. The more carbon dioxide goes back into the production of operating material, the more hydrogen must be fed into the system. Hydrogen atoms can be made available in the form of electrolytically produced hydrogen gas, for example, or in the form of natural gas with a high hydrogen gas content.

Such an energy supply system according to the invention enables a substantially more efficient design of the energy supply networks by combining different types of energy carrier with complementary characteristics in one overall system, namely electrical energy on the one hand and chemical energy in the form of fluid operating materials on the other hand. Electrical energy can be transported very quickly over large distances but is very difficult to store. Fluid operating materials, on the other hand, can be stored for as long as desired. However, due to their mass, transport is slower and more expensive.

Advantageously, fluid operating materials are used which have a maximally high energy density by volume, the density being controllable to a certain extent, of course, in gaseous, i.e., compressible operating materials. Table 1 below lists the energy densities of some fluid operating materials:

TABLE 1

| Fluid operating material | Energy density [MJ/kg] | Density* [kg/m$^3$] | Energy density [MJ/m$^3$] |
|---|---|---|---|
| Methanol | 19.7 | 792 | 15840 |
| Natural gas H | 50 | 0.8 | 40 |
| Natural gas L | 36 | 0.8 | 29 |
| Hydrogen | 142 | 0.09 | 13 |
| Diesel** | 45.5 | 820 | 37310 |
| Gasoline** | 43 | 720 | 30240 |

*Density at normal pressure;
**examples of hydrocarbon mixtures

As fluid operating materials, diesel-analogous hydrocarbon mixtures are especially suitable because, on the one hand, they have a high energy density and, on the other hand, have lower transport requirements than pressurized natural gas.

For example, a line system can be used as a transport system for fluid operating materials in which the fluid operating material is continuously conveyed through pumping. Another possible transport system is transport in individual batches, for example by tanker, or a combination of such systems. A line-based transport system is advantageous for energy supply systems with relatively small spatial distributions, whereas transport by truck can be more favorable for greater distances and allows for flexible adjustments of the energy supply system.

Moreover, an energy supply system according to the invention advantageously comprises a system for the electrolytic production of hydrogen gas for use in the manufacture of the fluid operating materials. Especially advantageously, each energy-generating unit has such a system.

The use of electrical energy for the production of the hydrogen gas makes it possible to flexibly utilize irregularly or only temporarily occurring electrical energy, for example from remote wind power stations or from photovoltaic or solar thermal power stations, when the electrical energy is available and to store it for later use in chemical form either as compressed hydrogen gas or in the form of the fluid operating materials produced from the hydrogen gas and carbon-containing source material.

A method is known from the applicant's WO 2011/061299 A1 in which carbon-containing source materials and, optionally, hydrogen are converted into carbon-containing operating materials using a thermal chemical method in a closed loop. Heat energy produced in the method can be used to generate base load current. Peak-load current can in turn be flexibly generated from the operating materials produced. A supply system with two separate line circuits is known from the applicant's WO 2011/089200 A2. Using a first line circuit, various energy consumers are supplied with fluid operating materials, which have been produced, for example, using a system from WO 2011/061299 A1. Residual gas consisting substantially of carbon dioxide occurring during the energetic utilization is returned via a second line circuit to the system in order to close the carbon dioxide circuit again. The disclosure of WO 2011/061299 A1 and WO 2011/089200 A2 is hereby integrated in its entirety by reference as part of this description.

In another advantageous design variant of an energy supply system according to the invention, the at least one energy-generating unit has a utilization system with a first subunit for performing the pyrolysis of carbon-containing material into pyrolysis coke and pyrolysis gas; a second subunit for the gasification of the pyrolysis coke into synthesis gas and residues; and a third subunit for performing a conversion of the synthesis gas into fluid operating materials, with return gas being left over. All three subunits are sealed in a pressure-tight manner and form a closed circuit. A transport line for the pyrolysis gas connects the first subunit in a pressure-tight manner to the second subunit and/or to the third subunit. A transport line for the synthesis gas connects the second subunit in a pressure-tight manner to the third subunit and/or to the first subunit. A transport line for the return gas connects the third subunit in a pressure-tight manner to the first subunit and/or to the second subunit. The hydrogen gas is fed into at least one of the three subunits. Especially advantageously, the third subunit comprises a Fischer-Tropsch synthesis step and/or a liquid-phase methanol synthesis step.

Also advantageously, the utilization system is set up for the purpose of feeding residual gas from the second energy supply network to at least one of the three subunits.

What is more, in an energy supply system according to the invention, the at least one energy-generating unit can comprise a system for producing electric current. This system can have a process steam-operated steam turbine and/or a gas turbine operated using fluid operating materials, or a combined gas/steam turbine.

It is advantageous in such a variant of an energy supply system according to the invention for the at least one energy-generating unit to be provided for the purpose of feeding the electric current produced into the first energy supply network.

An especially advantageous design variant of an energy supply system according to the invention comprises a control unit that can communicate via a communication network with the at least one energy-generating unit and the at least one energy management unit or with an energy consumer of the energy supply system and that is set up for the purpose of controlling the operation of the various units.

Furthermore, the control unit can be set up for the purpose of communicating via a communication network with control units of other energy supply systems and/or with external power stations and/or with control systems of power networks of higher hierarchy levels.

An energy supply system according to the invention as described above advantageously has at least one energy management unit for supplying a local energy supply network. This energy management unit comprises devices for extracting electric current from the higher-level power network of the energy supply system, converting it into lower-voltage electric current, and feeding this lower-voltage electric current into a power network of the local energy supply network; as well as devices for extracting the fluid operating materials from the transport system for fluid operating materials of the energy supply system, for generating electric current from said fluid operating materials, and for feeding the electric current into said power network of the local energy supply network. Moreover, the energy management unit comprises a control system that is set up for the purpose of communicating via the communication network with the control unit of the energy supply system.

This control system of the at least one energy management unit is advantageously set up for the purpose of communicating via a communication network with local energy consumers and local energy producers of the local energy supply network.

The at least one energy management unit can also have devices for collecting residual gases occurring during the energetic utilization of the fluid operating materials in the energy management unit and for returning these residual gases to the residual gas transport system of the energy supply system.

In another advantageous variant, the at least one energy management unit of an energy supply network according to the invention has devices for heating heat media and/or chilling cold media, the energy required for this being drawn from the power network of the energy supply system and/or obtained through the energetic utilization of the fluid operating materials obtained from the operating material transport system of the energy supply system, and devices for feeding the heated heat media and/or chilled cold media into corresponding heat transport systems or cold transport systems of the local energy supply network.

The term "heat medium" is understood as referring to suitable fluid heat carriers, particularly water but also oil, steam or inert gas, for example. The term "cold medium," in turn, also refers fluid heat carriers, particularly water but also oil, steam or inert gas.

The control unit of an energy supply system according to the invention is especially advantageously set up for the purpose of controlling and coordinating the at least one energy-generating unit and the at least one energy management unit in such a way that the maximum transport rates into the two energy supply networks are lower than without control.

A second aspect of the invention relates to an advantageous energy management unit for supplying a local energy supply network. Such an energy management unit according to the invention for supplying a local energy supply network comprises devices for extracting electric current from a higher-level power network of an energy supply system, for converting it into lower-voltage electric current, and for feeding this lower-voltage electric current into a power network of the local energy supply network. Moreover, it comprises devices for extracting fluid operating materials from a transport system for fluid operating materials of the energy supply system, for generating electric current from said fluid operating materials, and for feeding said electric current into said power network of the local energy supply system. A control system of the energy management unit is set up for the purpose of communicating via the communication network with a control unit of the energy supply system.

Another advantageous embodiment of such an energy management unit according to the invention for supplying a local energy supply network comprises devices for extracting electric current from a higher-level power network of an energy supply system, for converting it into lower-voltage electric current, and for feeding this lower-voltage electric current into a power network of the local energy supply network. Moreover, it comprises devices for extracting fluid operating materials from a transport system for fluid operating materials of the energy supply system, for generating electric current from said fluid operating materials, and for feeding said electric current into said power network of the local energy supply system. A control system of the energy management unit is set up for the purpose of communicating via a communication network with a control unit of the energy supply system and of controlling the delivery rates of electric current from the higher-level power network and of fluid operating materials from the operating material transport system in such a way that a maximally uniform loading of the corresponding supply networks over time is achieved, and/or a minimally-sized dimensioning of the second energy supply network in relation to the line cross section and/or the operating pressure is achieved.

Especially advantageously, the control system is set up for the purpose of communicating via a communication network with local energy consumers and local energy producers of the local energy supply network.

The control system is especially advantageously set up for the purpose of controlling the energy management unit in such a way that it draws substantially only the base load of the power requirement of the local energy supply network from the higher-level power network, whereas the peak load of the power requirement of the local energy supply network is covered by the energetic utilization of fluid operating materials.

In addition, the control system can be set up for the purpose of controlling the energy management unit in such a way that the delivery rate of fluid operating materials from the operating material transport system is substantially constant over time.

In another advantageous design variant of an energy management unit according to the invention, devices are provided for collecting residual gases occurring during the energetic utilization of the fluid operating materials in the energy management unit and for returning these residual gases to a residual gas transport system of the energy supply system.

In yet another advantageous variant, the energy management unit according to the invention comprises devices for heating heat media and/chilling cold media, the energy required for this being drawn from the power network of the energy supply system and/or obtained through the energetic utilization of the fluid operating materials obtained from the transport system of the energy supply system. Moreover, devices are provided for feeding the heated heat media and/or chilled cold media into corresponding heat transport systems or cold transport systems of the local energy supply network.

Another advantageous energy management unit for supplying a local energy supply network comprises devices for extracting electric current from a higher-level power network of an energy supply system, converting it into lower-voltage electric current, and feeding this lower-voltage electric current into a power network of the local energy supply network; and devices for extracting fluid operating materials from a transport system for fluid operating materials of the energy supply system, for generating electric current from said fluid operating materials, and for feeding the electric current into said power network of the local energy supply network. A control system is set up for the purpose of communicating via the communication network with a control unit of the energy supply system. The energy management unit further comprises devices for collecting residual gases occurring during the energetic utilization of the fluid operating materials in the energy management unit and for returning these residual gases to a residual gas transport system of the energy supply system.

In such an energy management unit, the control system is especially advantageously set up for the purpose of alternately extracting fluid operating materials from a transport system for fluid operating materials and residual gases of the energy supply system designed as a common line system, and feeding residual gases into this common line system.

A third aspect of the invention relates to an advantageous method for supplying one or more local energy supply systems with electrical energy. In a method according to the invention for supplying one or more local energy supply systems with electrical energy, electrical energy is drawn from a higher-level power network and fed into a first energy supply network; fluid operating materials are produced using at least one energy-generating unit, are optionally temporarily stored, and fed into a second energy supply network, the energy required for the production of the fluid operating materials being drawn from the higher-level power network and, optionally, additionally obtained from energy-containing carbon-containing source materials; electrical energy is drawn from the first energy supply system with at least one energy management unit and fed into the local power network; using the at least one energy management unit, energy is obtained in the form of fluid operating materials from the second energy supply network, is optionally temporary stored, and electrical energy for the local energy supply system is produced through energetic utilization of the fluid operating materials for the local energy supply system and fed into the local power network; and the production of fluid operating materials by means of the at least one energy-generating unit and the obtaining of the two different forms of energy in the form of electrical energy and fluid operating materials through the at least one energy management unit is controlled and coordinated in such a way that the maximum transport rates in the two energy supply networks are lower than without controlling.

In yet another design variant of an energy management unit according to the invention, the latter is set up for the purpose of exchanging energy carriers with other energy management units according to the invention via the first energy supply network and/or the second energy supply network, the participating energy management units communicating with one another for this purpose.

For instance, two energy management units according to the invention connected via the energy supply networks can agree to exchange electrical energy as follows: A first energy management unit generates electrical current from fluid operating materials that it takes from the second energy supply network or from its intermediate storages and forwards it to the second energy management unit, where it is consumed. Such an embodiment has the advantage, for example, that the capacity of the second energy management unit to generate power is factually increased in this way when the first energy management unit does not need this capacity.

Alternatively or in addition, the energy management units according to the invention can also exchange energy in the form of operating materials; that is, a first energy management unit conducts fluid operating materials from its intermediate storages via the transport system of the second energy supply network to a second energy management unit, which stores these operating materials in its intermediate storages and/or uses them for energy utilization. Such an embodiment has the advantage, for example, that the capacity of the intermediate storages of the second energy management unit to generate power can be factually increased in this way through its use of the intermediate storages of the first energy management unit. Another advantage is the flexible allocation of energy in storable form, namely fluid operating materials, to the various energy management units, so that the system can quickly address changing demands without requiring the first energy supply network and/or the second energy supply network and the external energy-generating units having to have capacities that are substantially greater than the average required capacity level.

Alternatively or in addition, the energy management units according to the invention can also exchange occurring residual gases via a residual gas transport system of the energy supply system, i.e., a first energy management unit conducts residual gases from its intermediate stores via the residual gas transport system to the second energy management unit, which stores these residual gases in its intermediate stores to be returned later. Such an embodiment has the advantage, for example, that the capacity of the residual gas intermediate storages of the second energy management unit to generate power can be factually increased in this way through its use of the intermediate storages of the first energy management unit.

BRIEF DESCRIPTION OF THE DRAWINGS

To facilitate better understanding of the present invention, reference is made below to the drawings. These show only exemplary embodiments of the inventive subject matter and are not capable of limiting the invention to the features disclosed therein.

FIG. 1b shows a schematic view of one possible embodiment of a conveyor unit of a transport system from FIG. 1a.

DETAILED DESCRIPTION OF THE INVENTION

Figure 1:
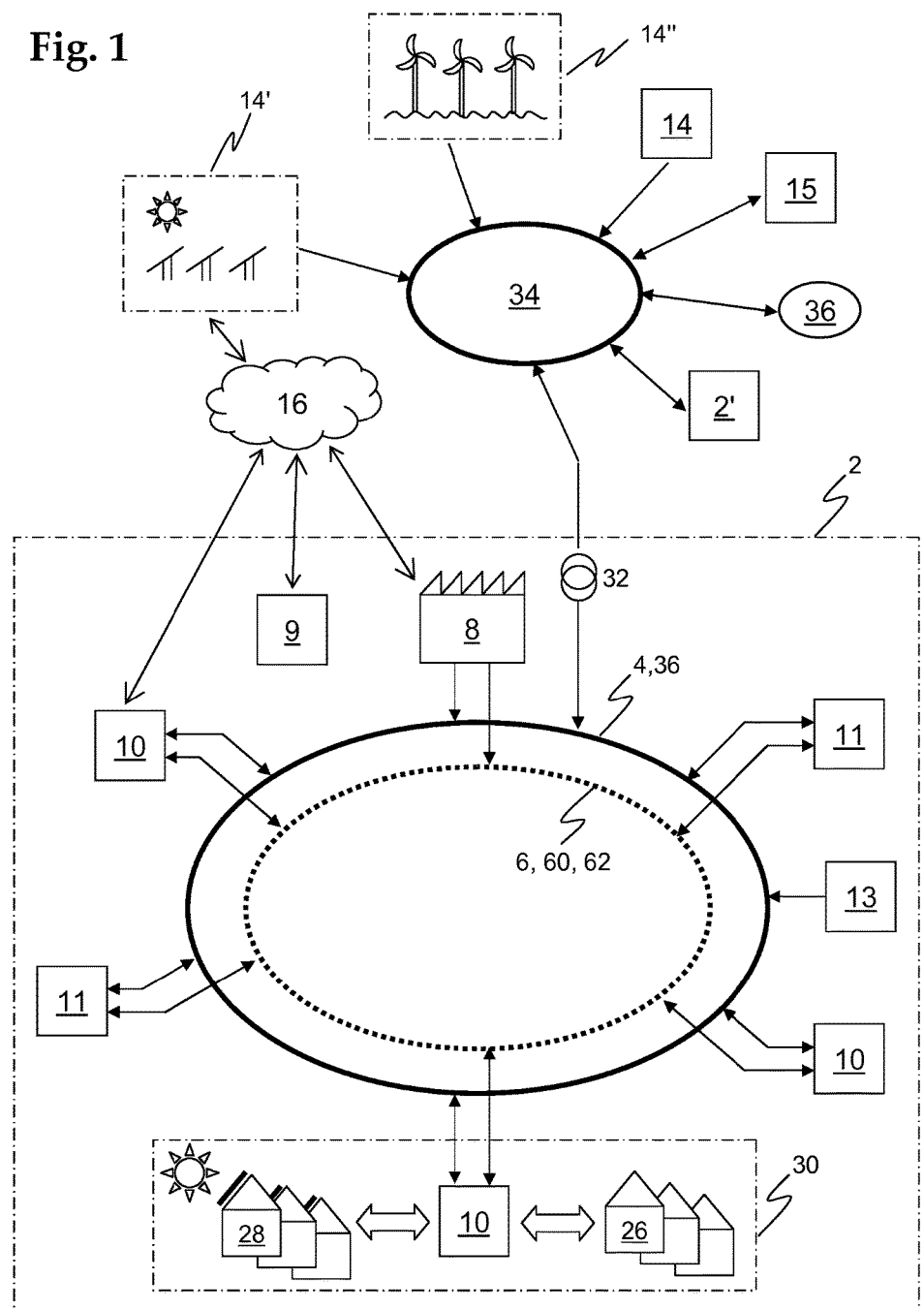
FIG. 1 shows a schematic view of one possible embodiment of an energy supply system according to the invention interacting with a higher-level energy supply network and a local energy supply network.

An exemplary embodiment of an energy supply system 2 according to the invention is shown schematically in FIG. 1.

A first energy supply network 4 comprises a power network 36 for distributing the electrical energy within the energy supply network. This power network 4 can be embodied as a regional medium-voltage power grid, for example. A second energy supply network 6 comprises a transport for transporting fluid, i.e., liquid or gaseous, operating materials as a second form of energy. In the depicted example, the transport system 60 is embodied as a loop system, but it can also have a different topological design, such as that of a branched line network, for example.

Figure 2:
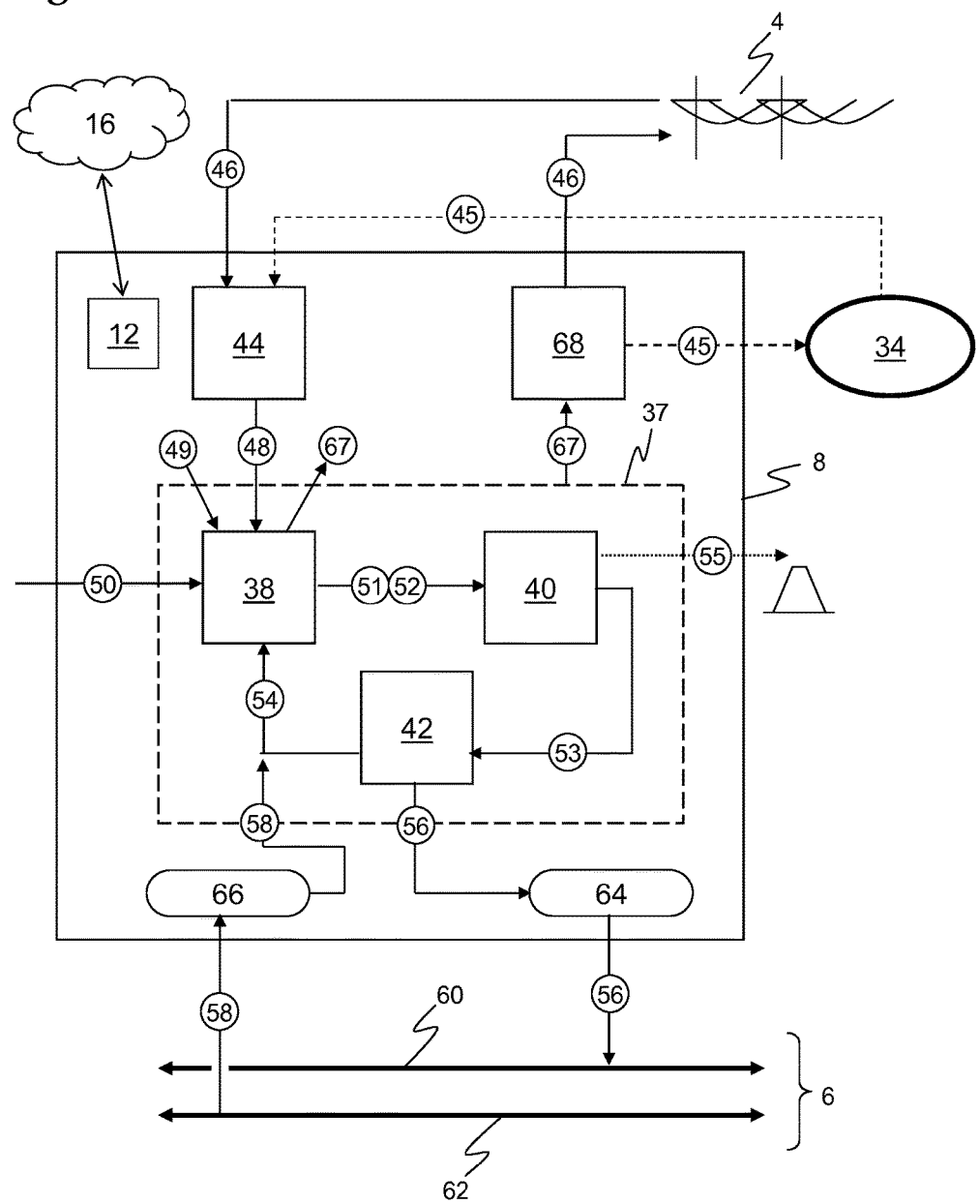
FIG. 2 shows a schematic view of one possible embodiment of an energy-generating unit for use in an energy supply system as shown in FIG. 1.
Figure 3:
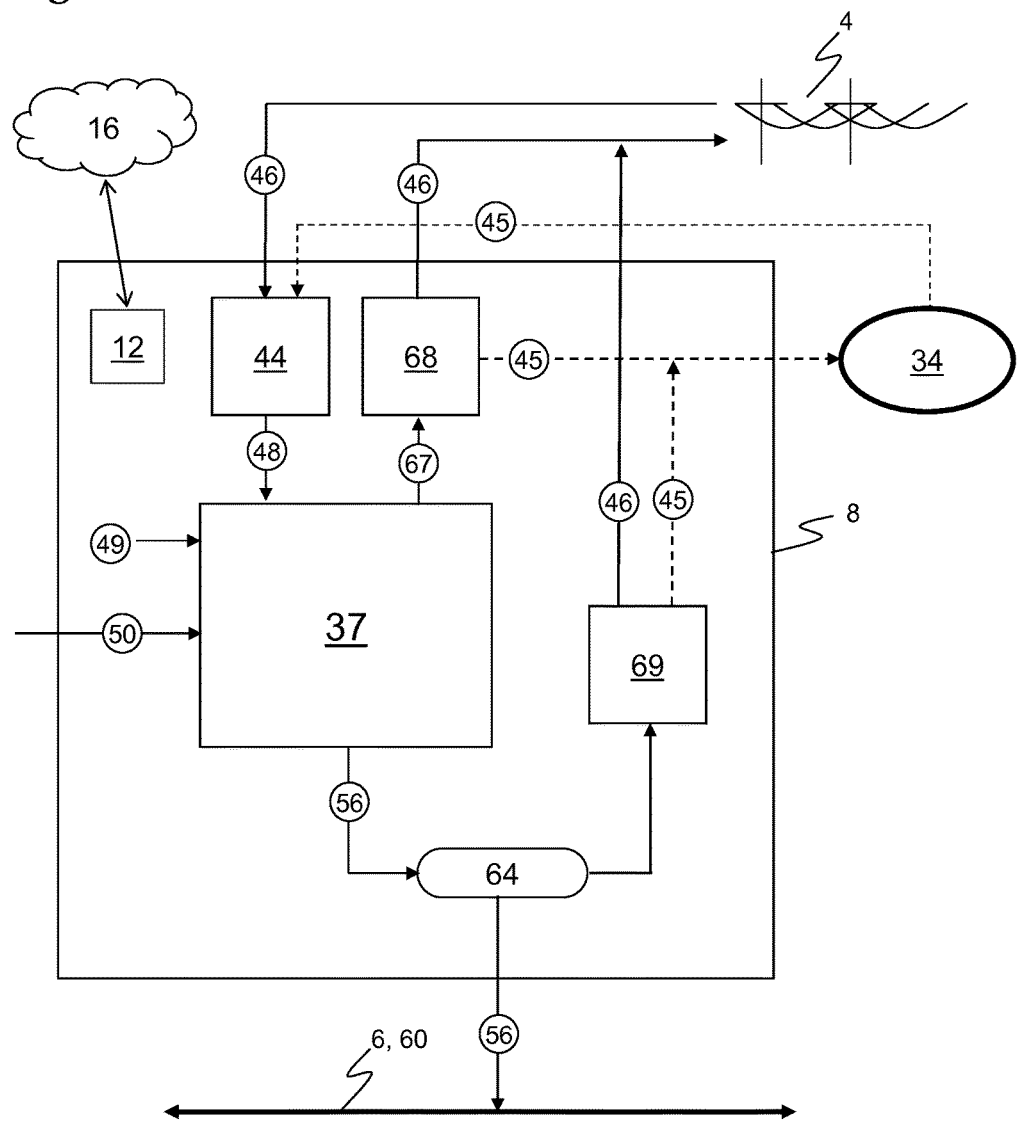
FIG. 3 shows a schematic view of another possible embodiment of an energy-generating unit for use in an energy supply system as shown in FIG. 1.

An energy-generating unit 8, which is shown in even more detail in FIGS. 2 and 3, generates the fluid operating materials and feeds them into the transport system 60. Several generic energy consumers 11 draw energy from the two energy supply networks 4, 5, as do several energy management systems 10 for supplying energy to local energy supply systems 32. Possible embodiments of energy management systems 10 according to the invention are discussed with respect to FIGS. 4, 5 and 6. Smaller electrical power stations 13, such as smaller wind power stations and hydro-electric power stations, for example, can also be part of the network 4.

The energy supply system 2 or, to put it more precisely, the power network 4, 36 of the energy supply system. is connected via a substation to a power network of a higher hierarchy level 34, here an interregional high-voltage electrical network 34 for the sake of example, from which it draws electrical energy. As shown here, additional regional power networks 36' and other energy supply systems 2' according to the invention can be connected to the higher-level power network 34. Various electric power plants 14, 15 provide current to the high-voltage electrical network 34, for example photovoltaic or solar thermal grass power stations 14' and wind power stations 14".

A control unit 9 of the energy supply system 2 according to the invention is connected via a generic communication network 16 (not specified in further detail), for example the internet, a wireless telecommunications network, or a line-supported communication network set up especially for this purpose, to the energy-generating units 8. the energy management units 10 according to the invention, and the other generic energy consumers 11 and energy producers 13 and can exchange data and control commands with same. In the depicted example, the control unit 9 can also communicate with external systems, such as power station 14', for example, or corresponding control points of the higher-level network 34.

The control device 9 of an energy supply system 2 according to the invention has the purpose of enabling the various energy consumer units 10, 11 to be efficiently supplied with fluid operating materials, thus enabling the minimally small dimensioning of the operating material transport system of the second energy supply network 6 both in relation to the line cross section and the operating pressure.

Advantageously, the individual energy management units are supplied in a hierarchized manner. The returning of the residual gases 58 to the line system 62, if present, can also be controlled in a hierarchized manner. Therefore, instead of each energy consumer drawing energy from the second energy supply network 6 as desired and needed and pumping residual gases into same, the delivery occurs in a coordinated manner, whereby substantially fewer peak volumes occur. The various energy consumer units store the fluid operating materials and residual gases in tanks or pressure accumulators until the operating materials are used and the residual gases are returned. Besides the minimal dimensioning of the supply network, the centralized control of the supply also enables minimal design of these intermediate storages, as opposed to a possible solution with extremely large intermediate storages and without centralized control.

In another advantageous variant, the second energy supply network 6 can be embodied such that fluid operating materials and residual gases are both transported via a common line system. For this purpose, the two different media are conveyed in a pulsed manner, that is, only one respective medium is conveyed at a given point in time, a switch being made between the different media as required. For example, during a first feed pulse, liquid operating material is pumped from the energy-generating unit through the line system to one or more energy management systems or other energy consumers, which receive and temporarily store the operating material. During a second feed pulse, compressed residual gas mixture is pumped by the energy management systems or other energy consumers through the same line systems in the opposite direction to the energy-generating unit.

The regulation of the pulses can be demand-driven, or it can occur according to a predetermined periodic pattern.

Such an advantageous solution requires only one line system and is therefore more cost-effective in terms of construction and maintenance. By virtue of their different physicochemical properties (liquid or gaseous, very different vapor pressures), the two media (liquid operating materials and residual gas mixture) can be separated without difficulty. Practically no gas residues remain in the liquid operating materials. The fraction of vaporous operating materials in the residual gas can be separated off and recovered through condensation. In addition, the partial pressure/gas pressure of the operating material in the residual gas remains the same at constant temperature, whereby the relative content can be minimized by means of high operating pressure. However, such operating material fractions can also be left in the residual gas mixture, since they are also automatically recycled during the processing of the residual gases and made available again as operating materials.

A common line system is suitable especially for spatially smaller energy supply systems, since the changeover phase between the different media otherwise takes too long due to the larger volume of the line system. The reason for this is that, during a medium change, the line system must be emptied of the respective previous medium and filled with the other medium before transport can effectively occur. Alternatively, the feed pulses can also be selected so as to be longer, thus rendering the changeover phases without feeding capacity less relevant.

Figure 1A:
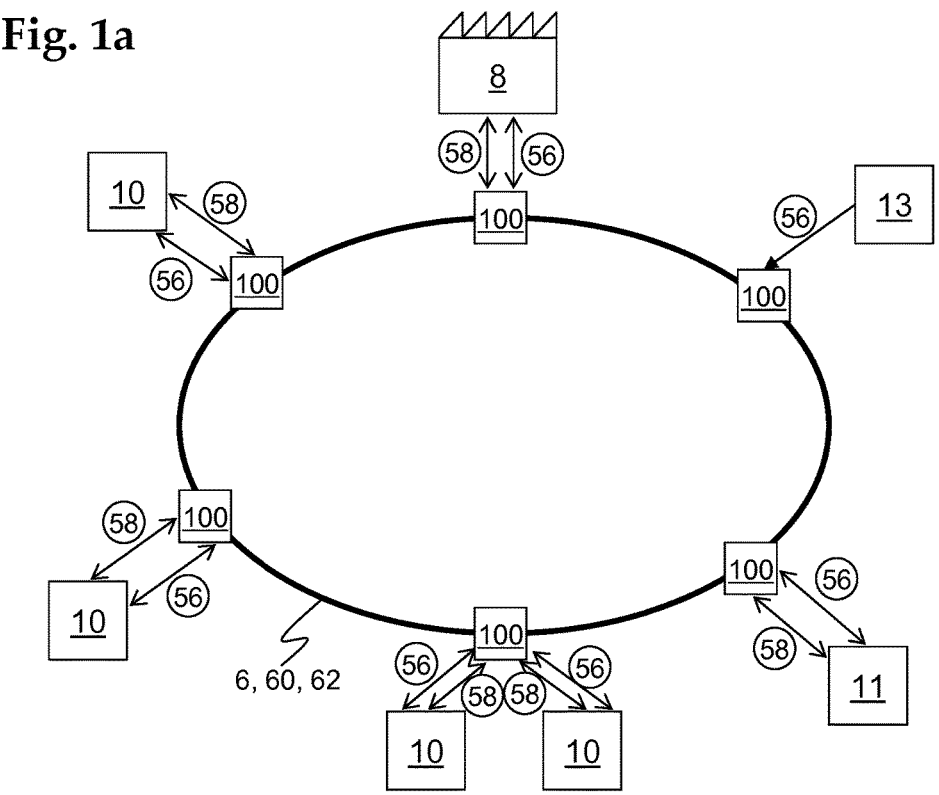
FIG. 1a shows a schematic view of one possible embodiment of a common transport system for fluid operating materials and residual gases.

Alternatively, liquid operating materials 56 can also be conveyed simultaneously with the residual gas mixture 58 through a common line system 6, 60, 62, in which case the transport occurs in segments between conveyor units 100. Such a system is shown schematically in FIG. 1a. The various units 8, 10, 11, 13, which feed operating materials 56 into the common transport system 60, 62 or extract them from same and feed residual gases 58 into the common transport system 60, 62 or extract them from same, are each connected via a conveyor unit 100 to the common transport system. It is also possible to hand several units onto a common conveyor unit 100, as shown at the bottom of FIG. 1a, for example, where two energy management units 10 are operatively connected to a conveyor unit 100.

Two conveyor units 100 are respectively connected to a section of the transport line, the transport of operating materials and/or residual gases each occurring unidirectionally. The depicted circular line topography is to be understood merely as an example. Star-shaped network topologies or networks are also possible. Accordingly, conveyor units 100 can also be connected only to one line section or to three or more sections.

Figure 1B:
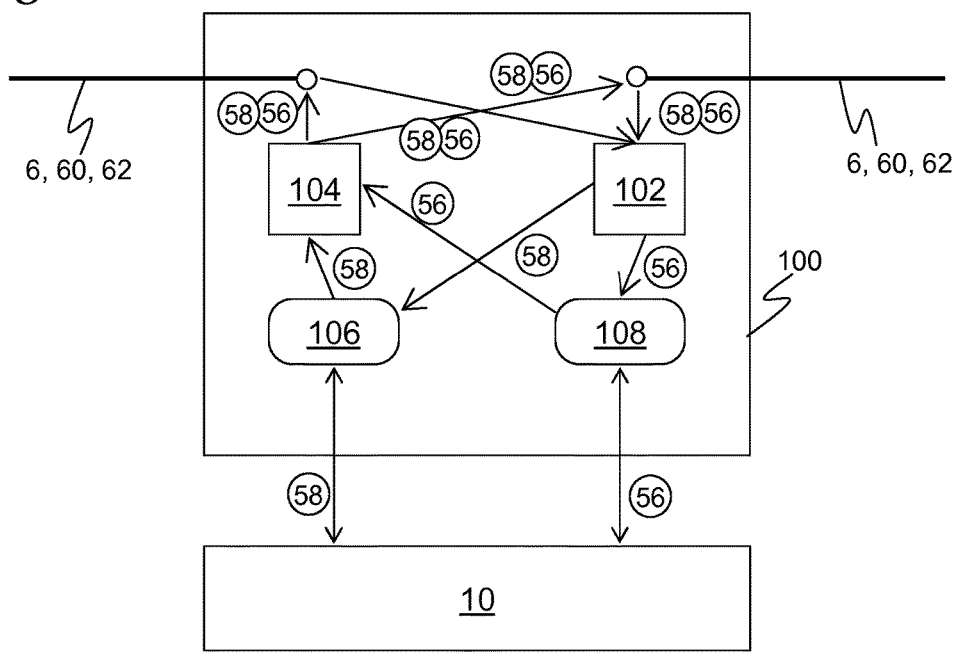

One advantageous embodiment of a conveyor unit 100 is shown schematically in FIG. 1b. The conveyor unit is connected to the ends of two line sections of the transport system 6, 60, 62. Any mixture of residual gases 58 and liquid operating material 56 that is conveyed through the line sections passes through corresponding deflector devices, for example corresponding valve devices, into a separation module 104, into which residual gases 58 and operating materials 56 are physically separated and stored in corresponding intermediate storages 106, 108. An energy management unit 10 removes residual gases and operating materials from these intermediate storages and feeds residual gases and operating materials into the intermediate tanks.

A conveyor module 104, in turn, comprising one or more pump units, for example, conveys the desired quantities of residual gases and operating materials from the intermediate storages to the line sections.

A control module (not shown) of the conveyor unit controls the removal and feed-in of the residual gases and operating materials into the two line sections according to the desired specifications. Advantageously, the control modules of the various conveyor units 100 of the transport system communicate with one another in order to coordinate the directions of conveyance and quantities and achieve maximally efficient transport.

In one variant of the depicted system, an activatable bypass can be provided in the conveyor unit in order to directly interconnect the two line sections when the conveyor unit is to be temporarily decoupled from the transport system.

Simultaneously, the feeding of fluid operating materials into the second energy supply network 6 and/or the removal of residual gases can be controlled in a centralized manner, which makes sense especially when several energy-generating units 8 are present. In the case of a single energy-generating unit, it can be sufficient to provide one large intermediate storage and to maintain the pressure in the system of the energy supply network within certain operational limits.

The control unit 9 can be implemented as a separate computer system or as a logical interconnection of different computer systems, the spatial location of these computer systems being irrelevant. The control unit 9 can thus be provided at the location of an energy-generating unit 8, for example, or at any other location. Likewise, a decentralized layout of the control device is possible, with several submodules that communicate with one another. The centralized controlling of the energy supply system 2 according to the invention is to be understood such that, in practice, the data of all of the different operative units 8, 10, 11, 13 flow into the control process, independently of whether the actual con commands to the units are generated by a certain computer system or the various units appropriately coordinate amongst themselves.

FIG. 2 shows a simplified schematic representation of an exemplary energy-generating unit 8 of the energy supply system 2 according to the invention, here in the form of a system for the thermal and chemical utilization of carbon-containing substances as disclosed in WO 2011/061299 A1.

In a substantially closed circuit, carbon-containing source material 50 and hydrogen gas 48 as chemical energy carriers as well as water 49 is converted in the thermal and chemical utilization system 37 into fluid operating materials 56, for example gaseous hydrocarbons such as methane, ethane or liquid hydrocarbons such as diesel-like mixtures, for example, or other chemical energy carriers such as methanol, for example.

Household refuse can be used as a carbon-containing source material 50, for example, as can other low-grade energy carriers, such as scrap tires, used oil and sewage sludge. Carbon dioxide-neutral biomasses such as woodchips, for example, are also suitable. Hydrogen gas 48 is used both as a hydrogen source and as a chemical energy carrier. If carbon dioxide is fed into the circuit as the carbon-containing source material, for example through the residual gas 58 from the second energy supply network 6 consisting substantially of carbon dioxide, the appropriate additional quantity of hydrogen gas 48 must be fed in.

Molecular hydrogen is produced from water using electrical energy through electrolysis. The electrical energy can originate particularly from regenerative energy sources such as hydropower, wind power, solar energy, etc., or from other sources such as nuclear power stations, for example, which otherwise cannot utilize their constantly generated thermal energy at times when the demand for current is low. The electrical energy can be drawn from the first energy supply network 4 (which, in turn, is connected to the high-voltage electrical network 34) or, alternatively, directly from the high-voltage electrical network 34, which results primarily from the specific design of the power network.

Whether the hydrogen gas is generated at the location at which it is consumed, that is, within the system 2, or at the location at which current is produced, is irrelevant to the invention. However, production near the place of subsequent consumption is advantageous for logistical reasons.

Storage devices for hydrogen gas can also be provided (not shown), for example in the form of metal hydride stores, or more cost-effectively in the form of pressure tanks. The conversion of electrical energy into chemical energy in the form of hydrogen thus makes it possible to utilize a supply surplus of electrical energy. Since the production output can be controlled very quickly, short-term production peaks on a local network, for example of rooftop photovoltaic power systems, can also be absorbed in this way without overloading the network. Accordingly, the capacities of the network can be better utilized without the risk of overload.

In the utilization system 37, in a first step 38 and second step 40, the carbon-containing source material 50 is converted into synthesis gas mixture 53. In the first step 38, the carbon-containing substances 50 are pyrolyzed, resulting in pyrolysis coke 51 and pyrolysis gas 52. In the second step 40, the pyrolysis coke 51 is gasified out of the first step, resulting in the synthesis gas mixture 53 and leaving behind slag and other residues 55. These are discharged and recycled or disposed of. In a third step 42, the liquid and/or gaseous operating materials 56 are generated from the synthesis gas mixture 53. The return gas mixture 54 remaining after the synthesis step 42 substantially contains carbon dioxide and is fed back into the first step 58 as a gasifying agent. All three steps are sealed in a pressure-tight manner and form a substantially closed circuit.

Using such a system 2, solid, liquid or gaseous substances 50 can be efficiently converted into gaseous or liquid operating materials 34. In addition, the system 2 can provide thermal energy in the form of process steam 67, from which constant electric current 46 is generated by means of a generator 68 operated by a steam turbine, the electric current 46 being fed into the medium voltage power network 4 and used to cover the base load. Alternatively, it can be fed into the high voltage power network 34.

The hydrocarbon-containing operating materials 56 produced in the synthesis step 42 are stored in an intermediate storage 64, for example in the form of a tank. In designing the intermediate storage, the volume of operating material present in the line system 60 can also be taken into account. Depending on the changing demand, the fluid operating materials 56 are fed into the second energy supply network 6, namely the transport system 60 for fluid operating materials. Corresponding conveyor devices are provided there (not shown).

In energy supply systems with a spatially compact design, this transport system is advantageously designed as a line system, for example in form of underground or above-ground lines. Sections of the transport system can also be implemented with tank car transports. This can be particularly advantageous if an energy supply system is under construction, or if a permanently installed line is not possible for other reasons, for example due to the distances involved, or due to the legal situation.

In the exemplary embodiment shown in the figure, the energy-generating unit 8 extracts residual gas 58, i.e., the gas mixture, which occurs during the energetic utilization of the fluid operating materials by energy consumer 11 and energy management units 10, from a transport system 62 for residual gases 58 of the second energy supply network 6. A pressure tank 66 is being used as an intermediate storage. This enables fluctuations in energy demand or in the mass flow of the residual gases to be bridged over without difficulty.

The residual gas is subsequently fed into the closed circuit of the thermal and chemical utilization system 37. This results in a closed loop, whereby substantially no carbon dioxide is discharged into the atmosphere. If the residual gas 58, in addition to the carbon dioxide and smaller quantities of carbon monoxide unutilized operating material, contains unusable inert gas fractions such as nitrogen, for example, then they are advantageously removed.

Liquid hydrocarbons or hydrocarbon mixtures, such as diesel-like mixtures, for example, or other organic compounds such as methanol, for example, are particularly suitable as fluid operating materials. Liquid operating materials enable a greater energy content per volume and, accordingly, a smaller dimensioning of the line network 60. However, gaseous operating materials are also possible, particularly methane, ethane, etc. Reference is made in this regard to table 1 above.

The external energy feed-in occurs in the energy-generating unit 8 via the hydrogen 58 and the electrical energy 46 required for the electrolytic production thereof, and/or via energy-containing, carbon-containing source materials 38, such as carbon dioxide-neutral biomass or difficult-to-utilize household refuse. To maintain the mass balance of the energy supply system according to the invention, it is only possible and necessary to feed in carbon-containing source materials 50 in order to compensate for lost carbon atoms in the mass flow, that is, when not all of the carbon makes it back to the energy-generating unit 8.

Another possible embodiment of an energy-generating unit 8 in an energy supply system 2 according to the invention is shown in FIG. 3. In this variant, the second energy supply system does not comprise a transport device for residual gases.

Analogous to FIG. 2, to generate electric current in the form of a power generator operated by a steam turbine, a system 68 utilizes the process heat 67 that occurs in the continuously operated thermal and chemical utilization system 37 in order to constantly generate electrical energy.

In addition, another system 69, which obtains its energy from the fluid operating materials, is also provided in order to produce electrical energy. Advantageously, such a system is designed as a thermal engine, for example a diesel engine or a gas turbine or a combined gas/steam turbine, with which a generator device is operated. The fact that such a system, through its design, can run variably between minimum power and maximum power, and the operating materials are taken from the intermediate storage 64, enables this system 69 to cover the demand peaks in the network 4 of the energy supply system 2 according to the invention, insofar as they still occur in conjunction with the energy management units 10 according to the invention, thus ensuring network stability.

It is also possible to flexibly feed electrical energy 45 into the higher-level high-voltage electrical network 34, for example in order to cover demand peaks, or in order to feed the first energy supply network 4 indirectly 32. Excess capacities of fluid operating material can thus also be diminished.

Figure 4:
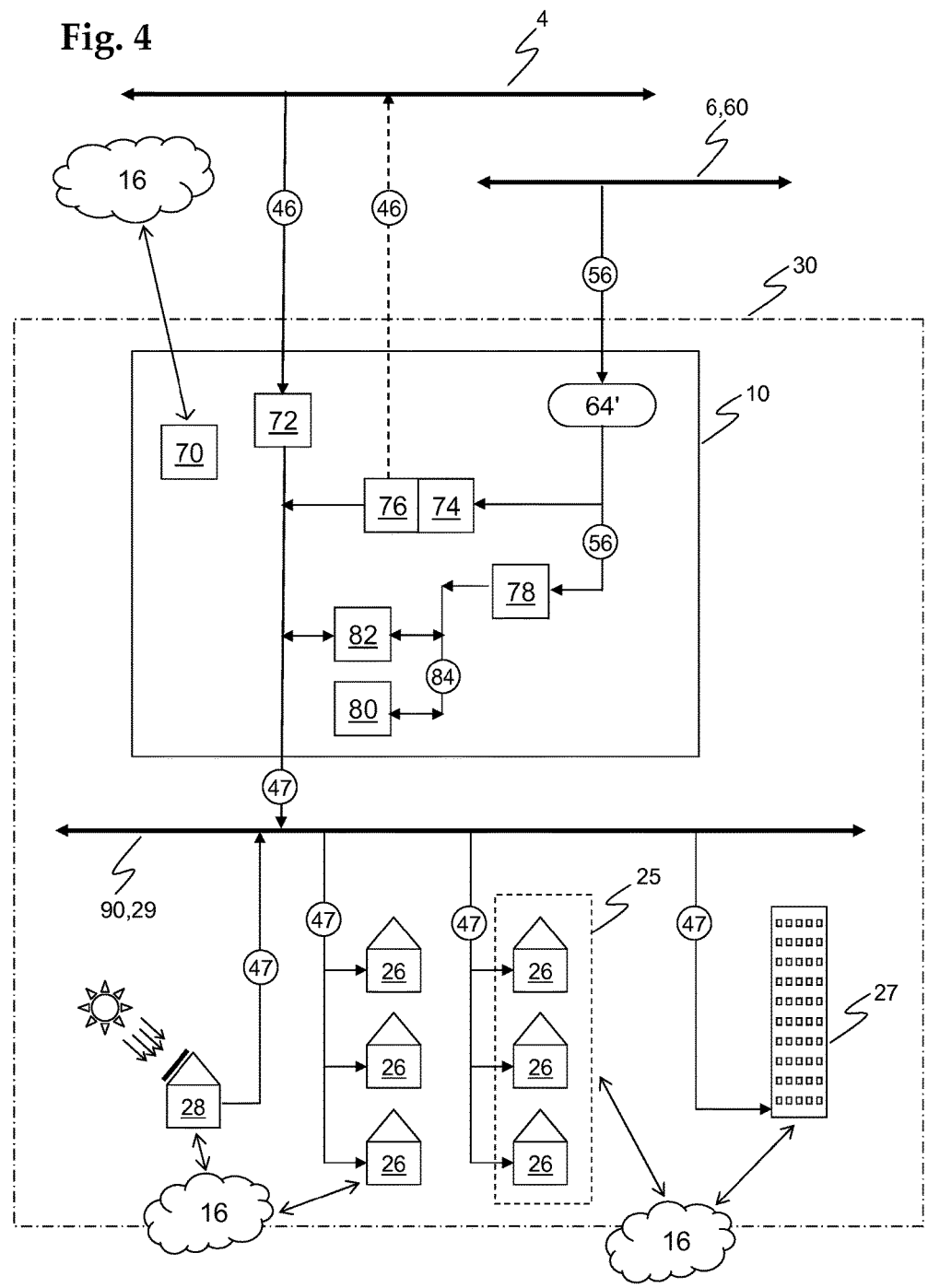
FIG. 4 shows a schematic view of one possible embodiment of an energy management system according to the invention interacting with an energy supply system according to the invention and a local energy supply network.

An energy management unit 10 according to the invention, as part of both an energy supply system 2 according to the invention and of a local energy supply system 30, is shown schematically in FIG. 4.

The energy management unit according to the invention has the purpose of supplying a local energy supply network 29 with electrical energy 47 in the form of a local low-voltage network 90. The local power network supplies several smaller energy consumers 26, individual households, for example and large-scale consumers 27, such as high-rise buildings, hospitals, etc. For this purpose, the energy management unit 10 draws electrical energy 46 from a first energy supply network 4 of an energy supply system 2 according to the invention and transforms it down to the mains voltage of the local power network 90. Furthermore, the energy management unit 10 obtains fluid operating materials 56 from a transport system 60 of a second energy supply network 6 of the energy supply system 2. These operating materials are stored in an intermediate storage 64' and used with suitable devices as needed to produce current 47 for the local network 90. For example, a generator 76 can be driven by a combustion engine operated with the fluid operating materials, or by a gas turbine.

As necessary, an energy management unit 10 can also completely decouple the local network completely from the first energy supply network 4 for a short time if this is necessary in order to maintain the stability of the network. Short-term power outages can also be absorbed in this way. As the end of this autonomous supply nears the end, appropriate warnings can also be sent to the local consumers. In this way, computer systems can be downloaded in a timely manner, for example, and standby sets can be started up early for critical systems such as those in hospitals, for example.

Alternatively or in addition, it is also possible to use a fuel cell device 78 to generate direct current 84 and its subsequent inversion 82 for the purpose of being fed into the local power network 90. It is also possible to use suitable current storage devices such as high-performance capacitors or accumulators 80.

The system 74, 76 can also be embodied such that, instead of feeding low voltage 47 into the local network 90, medium voltage 46 is generated and fed into the first energy supply network 4. In this way, in addition to the local power supply, the network stability of the medium-voltage power grid 45 can be improved. For instance, it is possible to replace the peak load current production system 69 in an energy-generating unit 10 as shown in FIG. 3 with a plurality of smaller peak load current production systems 74, 76 that are arranged so as to be distributed over the network 4.

The local power network 90 can also contain smaller current production systems 28 that feed the generated electrical energy into the local power network. Typical examples of this are small- and medium-sized photovoltaic power systems such as those installed on rooftops of houses and plant roofs.

The energy management unit 10 comprises a control system 70 for controlling the various functional elements of the overall system, particularly the obtaining of fluid operating materials 56 from the second energy supply network 6 and the current production from the fluid operating materials.

On the one hand, the control system 70 has the purpose of obtaining energy in the two forms, electricity 46 and fluid operating materials 56, from the first 4 and second 6 energy supply network of the energy supply system 2 such that a maximally uniform loading of the corresponding networks 36, 50 over time is achieved. For this purpose, the control system 70 can communicate via a suitable communication network 16 with a control unit 9 of the energy supply system 2 in order to coordinate the activities of the various units 8, 10, 11, 13 of the energy supply system 2.

In one possible, simple variant, the control system 70 can control the delivery rate for energy 46, 56 and the in-house production 74/76, 78 of the energy management unit 10 such that only the base load components or a portion of these base load components of the energy requirement of the local energy supply system 30 is covered by the power network 4, 36, and the remaining demand for current production 74, 76 is covered with the aid of the operating materials 56. The operating materials, in turn, are continuously removed from the transport system 60, the intermediate storage 64' acting as a buffer.

Timed, sequential deliveries of fluid operating materials from the second network 6 through the various energy management units 10 and generic energy consumers 11 are also possible, the coordination occurring via the control unit 12 of the energy supply system 2. For instance, the different recipients 10, 11 can fill up their intermediate storages successively with greater transport throughput instead of all of them simultaneously with a lesser throughput.

The second purpose of the control system 70 is the optimization of the loading of the local network. Advantageously, the control system 70 is designed such that it can also communicate with the individual energy consumers 26, 27 or groups of such consumers in order to collect data on the forecast and actual energy requirement. This can be done using so-called smart meters, for example.

Likewise, the control system 70 can collect data on the production of current by the local energy producers 28. These data, in turn, can also be utilized to optimize the energy deliveries from the energy supply system 2 and to control the production of hydrogen in the electrolysis systems 44 of the electrolysis systems 44 of the energy-generating units 8.

Figure 5:
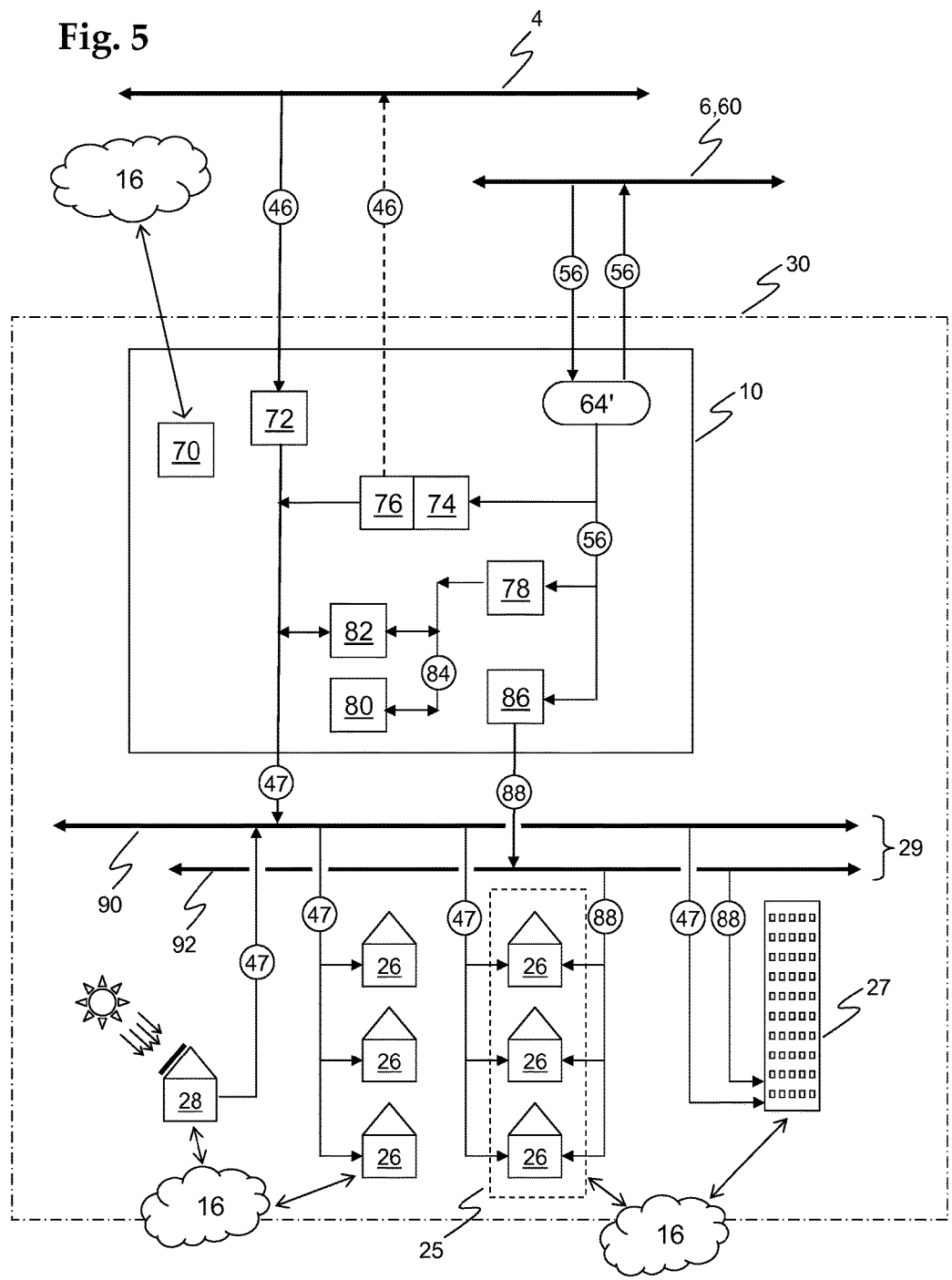
FIG. 5 shows a schematic view of another possible embodiment of an energy management unit according to the invention for supplying a local energy supply network, with a power network and a district heating network.

Another design variant of an energy management unit 10 according to the invention is shown in FIG. 5. In this exemplary embodiment of the invention, the energy supply system 29 of the local energy supply system 30, in addition to a power network 90, also has a district heating system 92 with which at least a portion of the energy consumers 26, 27 is supplied with heat energy 88. The energy management unit 10 comprises a heating system 86 for this purpose, for example a boiler, in which a heat carrier medium, such as water or steam, for example, is heated through combustion of the fluid operating materials 56. This is then fed into the district heating network.

In the embodiment shown in FIG. 5, the energy management unit 10 is set up for the purpose of not only removing fluid operating materials 56 from the second energy supply network 6 but also to feed them back into same as needed. In this way, a coordinated intermediate storage for fluid operating materials distributed over the entire energy supply network can be implemented, which is especially advantageous for spatially extended networks in order to further reduce bottlenecks during peak loads.

Figure 6:
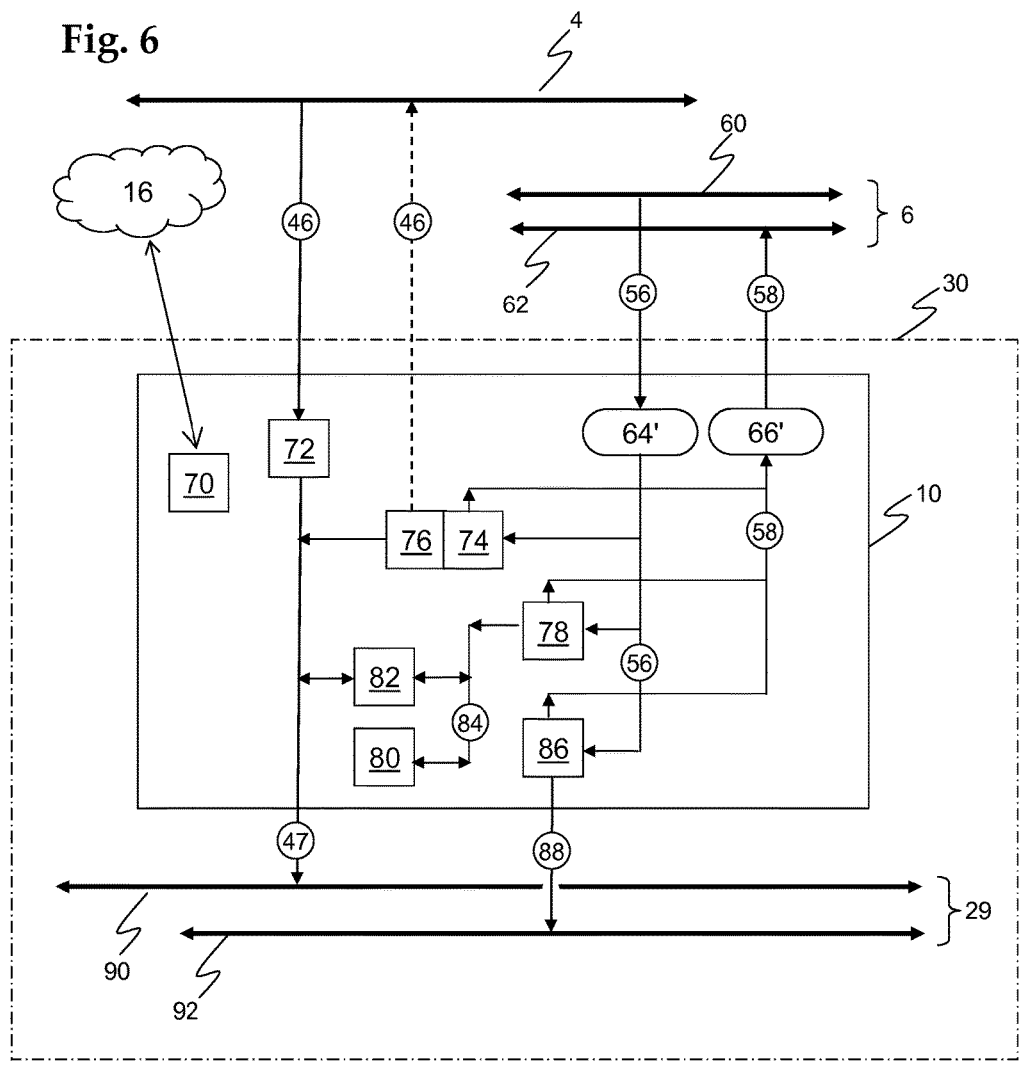
FIG. 6 shows a schematic view of another possible embodiment of an energy management unit according to the invention analogous to FIG. 5, with means for collecting residual gases of the energetic utilization of the fluid operating materials and the returning thereof to the second energy supply network of an energy supply system according to the invention.

FIG. 6 shows yet another advantageous embodiment of an energy management unit 10 according to the invention in operative interaction with an energy supply system 2 according to the invention. The local energy supply system 29 is embodied analogously to FIG. 5, the local consumers 26, 27 not being shown.

The second energy supply system 6 comprises two transport systems 60, 62 analogously to the exemplary embodiment of the invention in FIG. 2, namely for the fluid operating materials 56 on the one hand and for the residual gases 58 occurring during the energetic utilization of the aforementioned operating materials.

The oxidation of the fluid operating materials producing thermal or electrical energy in the various systems of the energy management unit is advantageously performed using oxygen-enriched air, preferably with an oxygen content of >9.5% or with pure oxygen, instead of with air, in order to reduce or avoid inert gas fractions. The energetic utilization of the operating materials can be done using combustion engines, for example, in which the heat occurring during the oxidation reaction is converted in a thermal engine into mechanical work, and this, in turn, into electrical energy by means of a generator, or using fuel cells in which the oxidation reaction is utilized directly to produce current. When using pure oxygen instead, substantially only carbon dioxide and water vapor are left behind in the occurring reaction products. Depending on the stoichiometry of the reaction, the occurring gases can also comprise certain components of carbon monoxide and unreacted operating material.

The residual gases occurring in the systems 74, 76, 86 of the energy management unit 10 in the form of carbon dioxide, water vapor and, optionally, components of carbon monoxide and unutilized operating material are collected during the energetic utilization of the fluid operating materials. Water vapor is advantageously condensed out, so that only gaseous residual gases 56 remain, which are collected in an intermediate storage 66' and fed into the energy supply network 6, 62. They are removed again from these by means of the at least one energy-generating unit 8 and fed again to operating material production as a carbon source, thereby closing the circuit.

If the transport system 60 is implemented in the form of the batchwise transport of operating materials, for example by means of truck tank cars, the corresponding truck tank cars can also be used for the return transport of the residual gases, provided that they have a pressure-tight design.

The present invention is not limited in its scope to the specific embodiments described herein. Rather, in addition to the examples disclosed herein, a person skilled in the art will derive various other modifications of the present agreement from the description and the associated figures that also fall within the scope of protection of the claims. In addition, various references are cited in the description whose disclosure is hereby incorporated in its totality into the description by reference.

The invention claimed is:

1. An energy supply system comprising:
a first energy supply network in the form of a power network for transporting electrical energy;
a second energy supply network with a transport system for fluid operating materials;
a transport system for returning carbon dioxide-containing residual gases that occur during energetic utilization of the fluid operating materials at one or more energy consumers; and
at least one energy-generating unit with which the fluid operating materials can be produced from carbon-containing material and fed into the second energy supply network;
wherein at least one local energy management unit for supplying a local energy supply network with which the fluid operating materials taken from the second energy supply network can be converted into electrical energy and fed into a local power network,
wherein the at least one energy management unit comprises devices for extracting electric current from the power network of the first energy supply network of the energy supply system, converting it into lower-voltage electric current, and feeding this lower-voltage electric current into a power network of the local energy supply network; as well as devices for extracting the fluid operating materials from the transport system for fluid operating materials of the energy supply system, for generating electric current from said fluid operating materials, and for feeding the electric current into said power network of the local energy supply network; and devices for collecting residual gases occurring during the energetic utilization of the fluid operating materials in the energy management unit, and for returning these residual gases to the residual gas transport system of the energy supply system;
by a control unit of the energy supply system that can communicate via a communication network with the at least one energy-generating unit and the at least one energy management unit or with another energy consumer of the energy supply system and is set up for the purpose of controlling the operation of the various units; and
by a control system of the at least one energy management unit that is set up for the purpose of communicating via the communication network with the control unit of the energy supply system;
wherein the control unit of the energy supply system controls the delivery rates of electric current from the power network of the first energy supply network and of fluid operating materials from the second energy supply network such that a maximally small dimensioning of the second energy supply network is achieved in relation to the line cross section and/or the operating pressure.

2. The energy supply system as set forth in claim 1, wherein the control unit of the energy supply system controls the delivery rates of electric current from the higher-level power network and of fluid operating materials from the operating material transport system such that a maximally uniform loading of the corresponding supply networks over time is achieved.

3. The energy supply system as set forth in claim 1, wherein the at least one energy-generating unit extracts residual gas from the residual gas transport system and uses its carbon-containing fractions to produce the fluid operating materials.

4. The an energy supply system as set forth in claim 1, further comprising a system for the electrolytic production of hydrogen gas for use in the manufacture of the fluid operating materials.

5. The energy supply system as set forth in claim 1, wherein the at least one energy-generating unit includes a utilization system, with a first subunit for performing pyrolysis of carbon-containing material into pyrolysis coke and pyrolysis gas; a second subunit for performing a gasification of the pyrolysis coke into synthesis gas and residues; and a third subunit for performing a conversion of the synthesis gas into fluid operating materials, return gas being left over; and wherein all three subunits are closed in a pressure-tight manner and form a closed circuit; a transport line for the pyrolysis gas connects the first subunit to the second subunit and/or with to the third subunit; a transport line for the synthesis gas that connects the second subunit in a pressure-tight manner to the third subunit and/or to the first subunit; and a transport line for the return gas that connects the third subunit in a pressure-tight manner to the first subunit and/or to the second subunit; and wherein the hydrogen gas is fed into at least one of the three subunits.

6. The energy supply system as set forth in claim 5, wherein the third subunit comprises a Fischer-Tropsch synthesis step and/or a liquid-phase methanol synthesis step.

7. The energy supply system as set forth in claim 5, wherein the utilization system feeds residual gas from the second energy supply network into at least one of the three subunits.

8. The energy supply system as set forth in claim 1, wherein the at least one energy-generating unit comprises a system for producing electric current.

9. The energy supply system as set forth in claim 8, wherein the system for producing electric current includes a steam turbine operated by process steam.

10. The energy supply system as set forth in claim 8, wherein the system for producing electric current includes a gas turbine operated with fluid operating materials or a combined gas/steam turbine.

11. The energy supply system as set forth in claim 8, wherein at least one energy-generating unit is provided for feeding the electric current produced into the first energy supply network.

12. The energy supply system as set forth in claim 11, wherein the control unit communicates via a communication network with control units of other energy supply systems and/or with external power stations and/or with control systems of power networks of higher hierarchy levels.

13. The energy supply system as set forth in claim 12, wherein the control system of the at least one energy management unit communicates via a communication network with local energy consumers and local energy producers of the local energy supply network.

14. The energy supply system as set forth in claim 11, wherein the at least one energy management unit includes devices for heating heat media and/or chilling cold media, the energy required for the heating and/or chilling drawn from the power network of the energy supply system and/or obtained through the energetic utilization of the fluid operating materials obtained from the operating material transport system of the energy supply system, and devices for feeding the heated heat media and/or chilled cold media into corresponding heat transport systems or cold transport systems of the local energy supply network.

15. The energy supply system as set forth in claim 11, wherein control unit of an energy supply system controls and coordinates the at least one energy-generating unit and the at least one energy management unit so that the maximum transport rates into the two energy supply networks are lower than without control.

16. An energy management unit for supplying a local energy supply network, comprising:
devices for extracting electric current from a higher-level power network of an energy supply system, converting it into lower-voltage electric current, and feeding this lower-voltage electric current into a power network of the local energy supply network; and devices for extracting the fluid operating materials from a transport system for fluid operating materials of the energy supply system, for generating electric current from said fluid operating materials, and for feeding the electric current into said power network of the local energy supply network; characterized by a control system that is set up for the purpose of communicating via a communication network with a control unit of the energy supply system, and controlling the delivery rates of electric current from the higher-level power network and of fluid operating materials from the operating material transport system such that a maximally uniform loading of the corresponding supply networks over time is achieved, and/or a minimally small dimensioning of the second energy supply network is achieved in relation to the conductor cross section and/or the operating pressure.

17. The energy management unit as set forth in claim 16, wherein the control system communicates via a communication network with local energy consumers and local energy producers of the local energy supply network.

18. The energy management unit as set forth in claim 16, wherein the control system controls the energy management unit to draw substantially only the base load of the power requirement of the local energy supply network from the higher-level power network, whereas the peak load of the power requirement of the local energy supply network is covered by the energetic utilization of fluid operating materials.

19. The energy management unit as set forth in claim 16, wherein the control system controls the energy management unit so that the delivery rate of fluid operating materials from the operating material transport system is substantially constant over time.

20. The energy management unit as set forth in claim 16, further comprising devices for collecting residual gases occurring in the energy management unit during the energetic utilization of the fluid operating materials and for returning these residual gases to a residual gas transport system of the energy supply system.

21. The energy management unit as set forth in claim 16, further comprising devices for heating heat media and/or chilling cold media, the energy required for the heating and/or chilling drawn from the power network of the energy supply system and/or obtained through the energetic utilization of the fluid operating materials obtained from the operating material transport system of the energy supply system, and a device for feeding the heated heat media and/or chilled cold media into corresponding heat transport systems or cold transport systems of the local energy supply network.

22. An energy management unit for supplying a local energy supply network, comprising:
devices for extracting electric current from a higher-level power network of an energy supply system, converting it into lower-voltage electric current, and feeding this lower-voltage electric current into a power network of the local energy supply network; and devices for extracting the fluid operating materials from the transport system for fluid operating materials of the energy supply system, for generating electric current from said fluid operating materials, and for feeding the electric current into said power network of the local energy supply network; characterized by a control system that is set up for the purpose of communicating via a communication network with a control unit of the energy supply system, and by devices for collecting residual gases occurring during the energetic utilization of the fluid operating materials in the energy management unit, and for returning these residual gases to a residual gas transport system of the energy supply system.

23. The energy management unit as set forth in claim 22, wherein the control system alternately extracts fluid operating materials from a transport system for fluid operating materials and residual gases of the energy supply system designed as a common line system, and feeds residual gases into this common line system.

24. A method for supplying one or more local energy supply systems with electrical energy, comprising:
drawing electrical energy from a higher-level power network and feeding into a first energy supply network;
producing fluid operating materials using at least one energy-generating unit, optionally temporarily storing the fluid operating materials, and feeding the fluid operating materials into a second energy supply network, the energy required for the production of the fluid operating materials being drawn from the higher-level power network and, optionally, additionally obtained from energy-containing, carbon-containing source materials;
drawing electrical energy from the first energy supply network using at least one energy management unit and feeding into the local power network;
obtaining energy in the form of fluid operating materials from the second energy supply network using the at least one energy management unit, optionally temporarily storing the fluid operating materials, and producing electrical energy for the local energy supply system through the energetic utilization of the fluid operating materials and feeding the electrical energy into the local power network; and
producing fluid operating materials by means of the at least one energy-generating unit as well as obtaining of the two different forms of energy in the form of electrical energy and fluid operating materials from the first energy supply network and from the second energy supply network is controlled and coordinated by the at least one energy management unit such that the maximum transport rates into the two energy supply networks are lesser than without control.

* * * * *